US012759727B2

(12) United States Patent
Clark et al.

(10) Patent No.: US 12,759,727 B2
(45) Date of Patent: Oct. 13, 2026

(54) ELECTRICAL LOCKOUT SYSTEM FOR AIRCRAFT PROPULSION SYSTEM

(71) Applicant: RTX Corporation, Farmington, CT (US)

(72) Inventors: Thomas E. Clark, Wells, ME (US); Murat Yazici, Glastonbury, CT (US); John Akin, Charlotte, NC (US); Andrew E. Breault, Bolton, CT (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/920,227

(22) Filed: Oct. 18, 2024

(65) Prior Publication Data

US 2026/0109471 A1 Apr. 23, 2026

(51) Int. Cl.
*B64D 45/00* (2006.01)
*B64D 29/06* (2006.01)

(52) U.S. Cl.
CPC .............. *B64D 45/00* (2013.01); *B64D 29/06* (2013.01); *B64D 2221/00* (2013.01)

(58) Field of Classification Search
None
See application file for complete search history.

(56) References Cited

U.S. PATENT DOCUMENTS

| | | | | |
|---|---|---|---|---|
| 9,064,646 | B2 * | 6/2015 | Wavering | H01H 9/286 |
| 2003/0192987 | A1 | 10/2003 | Ahrendt | |
| 2004/0139724 | A1 * | 7/2004 | Colotte | F02K 1/766 60/226.2 |
| 2017/0234232 | A1 * | 8/2017 | Sheridan | F01D 21/00 307/9.1 |
| 2019/0130288 | A1 * | 5/2019 | Boggio | B64D 45/00 |
| 2023/0067957 | A1 * | 3/2023 | Balsamello | H01H 13/14 |
| 2024/0219131 | A1 * | 7/2024 | Lewis | F28F 27/00 |

OTHER PUBLICATIONS

EP search report for EP25209897.5 dated Nov. 20, 2025.

* cited by examiner

*Primary Examiner* — Richard G Davis
(74) *Attorney, Agent, or Firm* — Getz Balich LLC

(57) ABSTRACT

A propulsion system for an aircraft includes a propulsor rotor, a powerplant, a nacelle and a lockout system. The powerplant is coupled to and configured to drive rotation of the propulsor rotor. An electrical system for the powerplant is configured to receive electrical power from an electrical power source. The nacelle includes an access structure configured to move between a first position and a second position. The access structure at least partially covers the electrical system when in the first position. The access structure is arranged in the first position for propulsion system operation. The access structure is operable to be arranged in the second position for propulsion system maintenance and/or propulsion system inspection. The lockout system is configured to automatically trigger an operation to cut off the electrical power to the electrical system from the electrical power source when the access structure moves away from the first position.

19 Claims, 5 Drawing Sheets

ELECTRICAL LOCKOUT SYSTEM FOR AIRCRAFT PROPULSION SYSTEM

BACKGROUND OF THE DISCLOSURE

1. Technical Field

This disclosure relates generally to an aircraft propulsion system and, more particularly, to an electrical system for the aircraft propulsion system.

2. Background Information

A propulsion system for an aircraft includes an electrical system servicing various components of the propulsion system. Various electrical system are known in the art. While these known electrical systems have various benefits, there is still room in the art for improvement.

SUMMARY OF THE DISCLOSURE

According to an aspect of the present disclosure, a propulsion system is provided for an aircraft. This propulsion system includes a propulsor rotor, a powerplant, a nacelle and a lockout system. The powerplant is coupled to and configured to drive rotation of the propulsor rotor. An electrical system for the powerplant is configured to receive electrical power from an electrical power source. The nacelle includes an access structure configured to move between a first position and a second position. The access structure at least partially covers the electrical system when in the first position. The access structure is arranged in the first position for propulsion system operation. The access structure is operable to be arranged in the second position for propulsion system maintenance and/or propulsion system inspection. The lockout system is configured to automatically trigger an operation to cut off the electrical power to the electrical system from the electrical power source when the access structure moves away from the first position.

According to another aspect of the present disclosure, another propulsion system is provided for an aircraft. This propulsion system includes a turbine engine, an electrical system, a housing structure and a lockout system. The turbine engine includes a compressor section, a combustor section and a turbine section. The electrical system includes an electrical component arranged with the turbine engine. The electrical system is configured to receive electrical power from an electrical power source onboard the aircraft. The housing structure at least partially surrounds the turbine engine. The housing structure includes an access structure covering a portion of the turbine engine with access to the electrical system. The access structure is configured in a first position for propulsion system operation. The access structure is configured to be moved from the first position for propulsion system maintenance and/or propulsion system inspection. The lockout system is configured to trigger electric decoupling of the electrical power source from the electrical system when the access structure moves away from the first position.

According to still another aspect of the present disclosure, an open rotor propulsion system is provided for an aircraft. This open rotor propulsion system includes a turbine engine, an electrical system, a housing structure and a lockout system. The turbine engine includes a compressor section, a combustor section and a turbine section. The electrical system includes an electrical component arranged with the turbine engine. The electrical system is configured to direct electrical power from an electrical power source onboard the aircraft to the electrical component at least during propulsion system operation. The housing structure at least partially houses the turbine engine. The housing structure includes an access structure covering a portion of the turbine engine with access to the electrical system. The access structure is configured in a first position for the propulsion system operation. The access structure is configured to be moved from the first position for propulsion system maintenance and/or propulsion system inspection. The lockout system is configured to electrically decouple the electrical power source from the electrical system when the access structure is disposed out of the first position.

The lockout system may be configured to automatically trigger the operation to cut off the electrical power to the electrical system from the electrical power source when the access structure is out of the first position.

The propulsion system may also include one or more switches configured to electrically couple the electrical power source to the electrical system during the propulsion system operation. The lockout system may be configured to open the one or more switches when the access structure moves away from the first position.

The propulsion system may also include one or more switches and a controller. The one or more switches are configured to electrically couple the electrical power source to the electrical system during the propulsion system operation. The lockout system may be configured to provide a lockout signal to the controller when the access structure moves away from the first position. The controller may be configured to control operation of the one or more switches such that the one or more switches open in response to the controller receiving the lockout signal.

The propulsion system may also include a user interface configured to provide a notification in response to the lockout system cutting off the electrical power to the electrical system from the electrical power source.

The propulsion system may also include a memory and a processing device. The processing device may be configured to log an entry in the memory in response to the lockout system cutting off the electrical power to the electrical system from the electrical power source.

The electrical system may include an electric machine.

The powerplant may include the electric machine.

The electrical system may include a controller.

The electrical power source may be configured as or otherwise include a battery system onboard the aircraft.

The electrical power source may be configured as or otherwise include an electrical power bus onboard the aircraft.

The powerplant may be configured as or otherwise include a thermal engine.

The propulsor rotor may be configured as or otherwise include a ducted propulsor rotor.

The propulsor rotor may be configured as or otherwise include an open propulsor rotor.

The access structure may be configured as or otherwise include a cowl door.

The access structure may be configured as or otherwise include a thrust reverser half.

The access structure may be configured as or otherwise include an access panel.

The lockout system may include a latch sensor configured to sense when a latch for the access structure is unlatched. The lockout system may be configured to automatically trigger the operation to cut off the electrical power to the electrical system from the electrical power source when the latch sensor senses the latch is unlatched.

The lockout system may include a proximity sensor configured to sense when the access structure moves from the first position. The lockout system may be configured to automatically trigger the operation to cut off the electrical power to the electrical system from the electrical power source when the proximity sensor senses the access structure moving from the first position.

The lockout system may include a hinge sensor disposed at a hinge connecting the access structure to another structure of the propulsion system. The lockout system may be configured to automatically trigger the operation to cut off the electrical power to the electrical system from the electrical power source when the hinge sensor senses movement in the hinge.

The propulsion system may also include an override configured to override the lockout system and electrically couple the electrical power source to the electrical system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
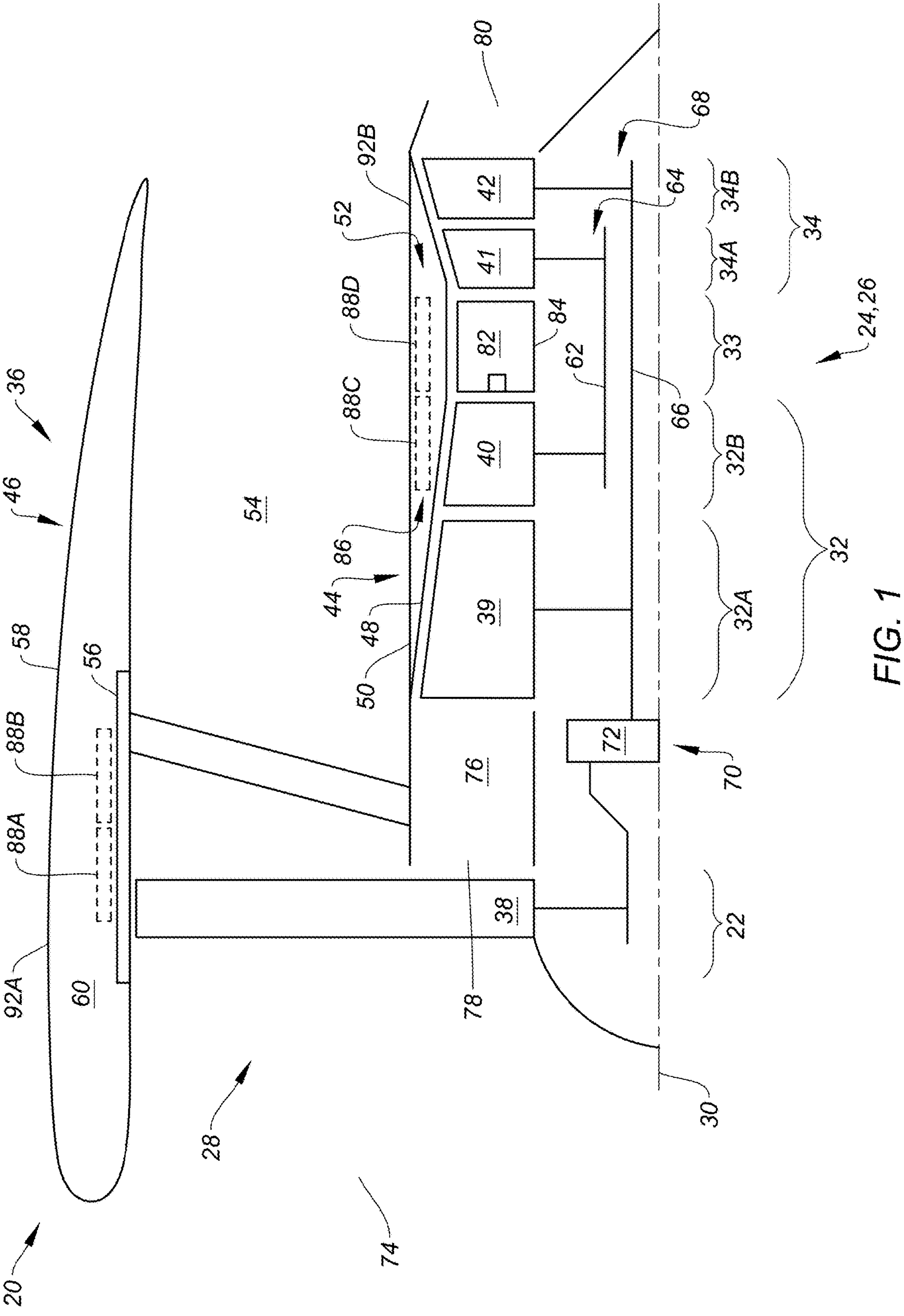
FIG. 1 is a partial schematic sectional illustration of an aircraft propulsion system with a ducted propulsor section.

FIG. 1 illustrates a propulsion system 20 for an aircraft. The aircraft may be an airplane, a drone (e.g., an unmanned aerial vehicle (UAV)) or any other manned or unmanned aerial vehicle or system. The aircraft propulsion system 20 of FIG. 1 includes a propulsor section 22 and a powerplant 24 configured to mechanically drive operation of the propulsor section 22. The powerplant 24 of FIG. 1, for example, is configured as a core 26 (e.g., a gas generator) of a gas turbine engine 28 such as a turbofan engine, and the propulsor section 22 is configured as a ducted propulsor section such as a fan section of the turbofan engine. The present disclosure, however, is not limited to such an exemplary propulsion system configuration. The aircraft propulsion system 20, for example, may alternatively be configured as a turbojet propulsion system, a propfan propulsion system, a pusher fan propulsion system, a turboprop propulsion system, or any other type of ducted or open rotor propulsion system. Moreover, while the aircraft propulsion system 20 is described above with the turbine engine 28, it is contemplated the powerplant 24 may alternatively be configured as or otherwise include another type of thermal engine (e.g., a rotary (Wankel-type) engine, a reciprocating piston engine, etc.) and/or one or more electric machines (e.g., electric motors).

The aircraft propulsion system 20 of FIG. 1 extends axially along an axis 30 between an axial forward, upstream end of the aircraft propulsion system 20 and an axial aft, downstream end of the aircraft propulsion system 20. Briefly, the axis 30 may be a centerline axis of the aircraft propulsion system 20, the turbine engine 28 and/or one or more of its members. The axis 30 may also or alternatively be a rotational axis for one or more members of the turbine engine 28.

The turbine engine 28 of FIG. 1 includes the propulsor section 22 (e.g., the fan section), a compressor section 32, a combustor section 33 and a turbine section 34. The compressor section 32 of FIG. 1 includes a low pressure compressor (LPC) section 32A and a high pressure compressor (HPC) section 32B. The turbine section 34 of FIG. 1 includes a high pressure turbine (HPT) section 34A and a low pressure turbine (LPT) section 34B.

The engine sections 22, 32A-34B may be arranged sequentially along the axis 30 within a stationary housing 36 (e.g., an engine housing) of the aircraft propulsion system 20 and its members 24, 28. The propulsor section 22 includes a bladed propulsor rotor 38; e.g., a fan rotor. The LPC section 32A includes a bladed low pressure compressor (LPC) rotor 39. The HPC section 32B includes a bladed high pressure compressor (HPC) rotor 40. The HPT section 34A includes a bladed high pressure turbine (HPT) rotor 41. The LPT section 34B includes a bladed low pressure turbine (LPT) rotor 42. These propulsion engine rotors 38-42 are housed within the propulsion system housing 36. The propulsion system housing 36 of FIG. 1, for example, includes an inner housing structure 44 and an outer housing structure 46. Here, at least (or only) the LPC section 32A, the HPC section 32B, the combustor section 33, the HPT section 34A and the LPT section 34B collectively form the engine core 26.

The inner housing structure 44 of FIG. 1 includes an inner case 48 (e.g., a core case) for the turbine engine 28, an inner nacelle structure 50 (sometimes referred to as an inner fixed structure (IFS)) and an internal inner housing compartment 52. The inner case 48 is disposed radially outboard of, extends axially along and may circumscribe one or more or all of the engine sections 32A-34B and their respective engine rotors 39-42. The inner case 48 may thereby house and provide a support structure for the respective engine sections 32A-34B and their respective engine rotors 39-42. The inner nacelle structure 50 is configured to provide an aerodynamic cover over the engine core 26 and its inner case 48. The inner housing compartment 52 of FIG. 1 is formed by and is disposed radially between the inner case 48 and an inner barrel of the inner nacelle structure 50. The inner housing structure 44 and its inner nacelle structure 50 may also form a radial inner peripheral boundary of a (e.g., annular) bypass flowpath 54 within the aircraft propulsion system 20.

The outer housing structure 46 of FIG. 1 includes an outer case 56 (e.g., a fan case) for the turbine engine 28, an outer nacelle structure 58 and an internal outer housing compartment 60. The outer case 56 is disposed radially outboard of, extends axially along and may circumscribe the propulsor section 22 and its propulsor rotor 38. The outer case 56 may thereby house and provide a containment structure for the propulsor section 22 and its propulsor rotor 38. The outer nacelle structure 58 is configured to provide an aerodynamic cover over the outer case 56. The outer housing compartment 60 of FIG. 1 is formed by and is disposed radially between the outer case 56 and one or more cowls (e.g., fan cowls) of the outer nacelle structure 58. The outer housing structure 46 and its outer nacelle structure 58 may also form a radial outer peripheral boundary of the bypass flowpath 54.

The HPC rotor 40 is coupled to and rotatable with the HPT rotor 41. The HPC rotor 40 of FIG. 1, for example, is connected to the HPT rotor 41 through a high speed shaft 62. At least (or only) the HPC rotor 40, the HPT rotor 41 and the high speed shaft 62 collectively form a high speed rotating assembly 64; e.g., a high speed spool of the engine core 26. This high speed rotating assembly 64 of FIG. 1 and its members 40, 41 and 62 are rotatable about the axis 30. However, it is contemplated the high speed rotating assembly 64 may alternatively be rotatable about another axis radially and/or angularly offset from the rotational axis of the propulsor rotor 38 and/or the centerline axis of the aircraft powerplant 24.

The LPC rotor 39 is coupled to and rotatable with the LPT rotor 42. The LPC rotor 39 of FIG. 1, for example, is connected to the LPT rotor 42 through a low speed shaft 66. At least (or only) the LPC rotor 39, the LPT rotor 42 and the low speed shaft 66 collectively form a low speed rotating assembly 68; e.g., a low speed spool of the engine core 26. This low speed rotating assembly 68 is further coupled to the propulsor rotor 38 through a drivetrain 70. This drivetrain 70 may be configured as a geared drivetrain, where a geartrain 72 (e.g., a transmission, a speed change device, an epicyclic geartrain, etc.) is disposed between and operatively couples the propulsor rotor 38 to the low speed rotating assembly 68 and its LPT rotor 42. With this arrangement, the propulsor rotor 38 may rotate at a different (e.g., slower) rotational speed than the low speed rotating assembly 68 and its LPT rotor 42. Alternatively, the drivetrain 70 may be configured as a direct drive drivetrain, where the geartrain 72 is omitted. With such an arrangement, the propulsor rotor 38 rotates at a common (the same) rotational speed as the low speed rotating assembly 68 and its LPT rotor 42. The low speed rotating assembly 68 of FIG. 1 and its members 39, 42 and 66 as well as the propulsor rotor 38 are rotatable about the axis 30. However, it is contemplated the low speed rotating assembly 68 may alternatively be rotatable about another axis radially and/or angularly offset from the rotational axis of the propulsor rotor 38 and/or the centerline axis of the powerplant 24.

During operation, ambient air from outside of the aircraft enters the aircraft propulsion system 20 and its turbine engine 28 through an airflow inlet 74. This air is directed across the propulsor section 22 and into a (e.g., annular) core flowpath 76 and the bypass flowpath 54. The core flowpath 76 of FIG. 1 extends sequentially through the LPC section 32A, the HPC section 32B, the combustor section 33, the HPT section 34A and the LPT section 34B from an airflow inlet 78 into the core flowpath 76 to a combustion products exhaust 80 out from the core flowpath 76 and the engine core 26. The air entering the core flowpath 76 may be referred to as "core air". The bypass flowpath 54 extends through a bypass duct, which bypass flowpath 54 and bypass duct bypass (e.g., are disposed radially outboard of and extend along) the engine core 26 and the inner housing structure 44. The air within the bypass flowpath 54 may be referred to as "bypass air".

The core air is compressed by the LPC rotor 39 and the HPC rotor 40 and is directed into a (e.g., annular) combustion chamber 82 of a (e.g., annular) combustor 84 in the combustor section 33. Fuel is injected into the combustion chamber 82 by one or more fuel injectors and mixed with the compressed core air to provide a fuel-air mixture. This fuel-air mixture is ignited and combustion products thereof flow through and sequentially drive rotation of the HPT rotor 41 and the LPT rotor 42 about the axis 30. The rotation of the HPT rotor 41 and the LPT rotor 42 respectively drive rotation of the HPC rotor 40 and the LPC rotor 39 about the axis 30 and, thus, compression of the air received from the core inlet 78. The rotation of the LPT rotor 42 also drives rotation of the propulsor rotor 38. The rotation of the propulsor rotor 38 propels the bypass air through and out of the bypass flowpath 54. The propulsion of the bypass air may account for a majority of thrust generated by the turbine engine 28 of FIG. 1.

Figure 2:
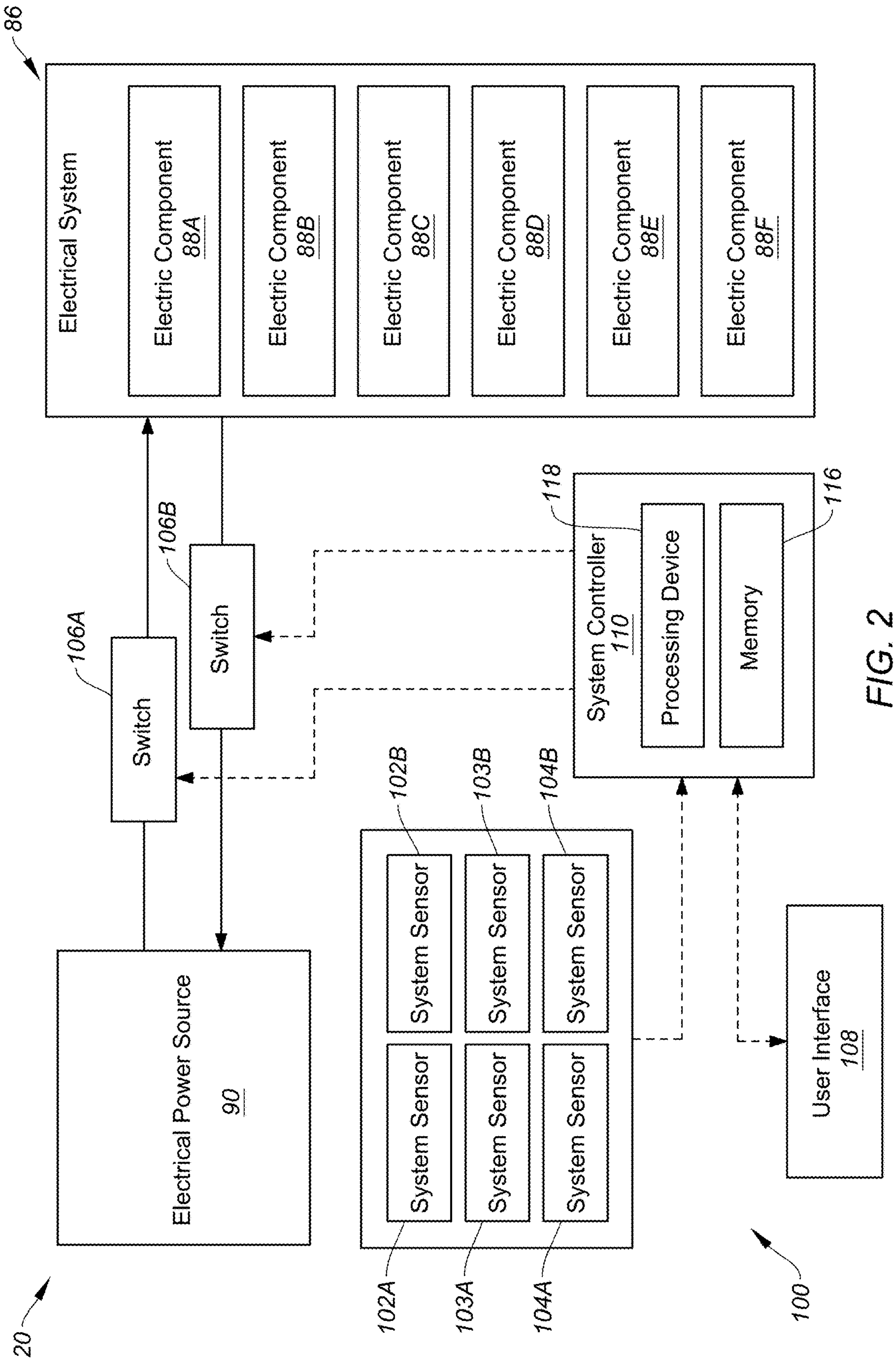
FIG. 2 is a schematic illustration of an electrical system for the aircraft propulsion system arranged with an electrical power source and an electrical lockout system.

Referring to FIG. 2, the aircraft propulsion system 20 includes an electrical system 86 to facilitate operation, control and/or monitoring of various propulsion system members; e.g., the turbine engine, the powerplant, one or more engine accessories, etc. The electrical system 86 of FIG. 2 includes various electric components 88A-F (generally referred to as "88") for one or more electrical subsystems operating, controlling and/or monitoring propulsion system operation. Examples of the electrical subsystems include, but are not limited to, a sensor system, an actuator system, an ignition system, an electric machine system and a control system. The electric components 88 may be arranged with, mounted to and/or integrated as part of the propulsion system members being operated, controlled and/or monitored by the electrical system 86. Examples of these electric components 88 include, but are not limited to, sensor(s), actuator(s), valve(s), pump(s), switch(es), ignitor(s), electric machine(s), electric machine controller(s) and onboard controller(s). Examples of the electric machine include, but are not limited to, an electric generator, an electric motor and an electric motor-generator. Examples of the electric machine controller include, but are not limited to, a generator controller, a motor controller and a motor-generator controller. Examples of the onboard controller include, but are not limited to, an electronic engine controller (EEC), an electronic control unit (ECU), a full-authority digital engine controller (FADEC), etc.

The electrical system 86 of FIG. 2 also includes one or more low voltage and/or high voltage lines electrically coupling the electric components 88 together and/or to an electrical power source 90 for the aircraft propulsion system 20. The electrical power source 90 may be configured as or otherwise include an electric generator, a fuel cell system and/or a battery system. The electrical power source 90 may also or alternatively be configured as or otherwise include a power distribution device such as an electrical power bus. This power distribution device may electrically couple the electrical system 86 and its electric components 88 to the electric generator, the fuel cell system, the battery system and/or another electrical power source; e.g., a shore power system or other power source onboard or offboard the aircraft.

Referring to FIG. 1, an outer set of one or more of the electric components 88A and 88B may be mounted and/or otherwise arranged with the outer case 56. This outer set of the electric components 88A and 88B may be at least partially (or completely) disposed within the outer housing compartment 60 and/or otherwise accessible from the outer housing compartment 60. The outer set of the electric components 88A and 88B may be accessible for installation, removal, maintenance, inspection, etc. when opening or removing one or more forward housing access structures 92A; e.g., cowls, doors, hatches, panels, etc. In addition or alternatively, an inner set of one or more of the electric components 88C and 88D may be mounted to and/or otherwise arranged with the inner case 48. This inner set of the electric components 88C and 88D may be at least partially (or completely) disposed within the inner housing compartment 52 and/or otherwise accessible from the inner housing compartment 52. The inner set of the electric components 88C and 88D may be accessible for installation, removal, maintenance, inspection, etc. when opening or removing one or more aft housing access structures 92B; e.g., cowls, doors, hatches, panels, thrust reverser halves, inner fixed structure (IFS) halves, etc.

Figure 4:
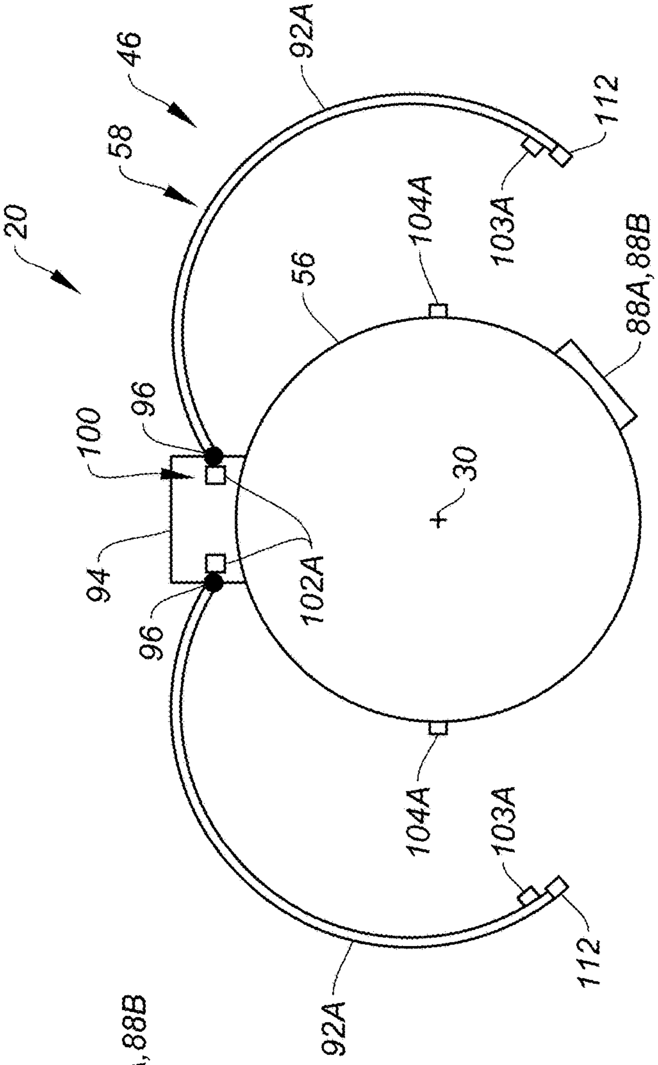
FIG. 4 is an end view schematic illustration of the aircraft propulsion system with its forward housing access structures open.
Figure 3:
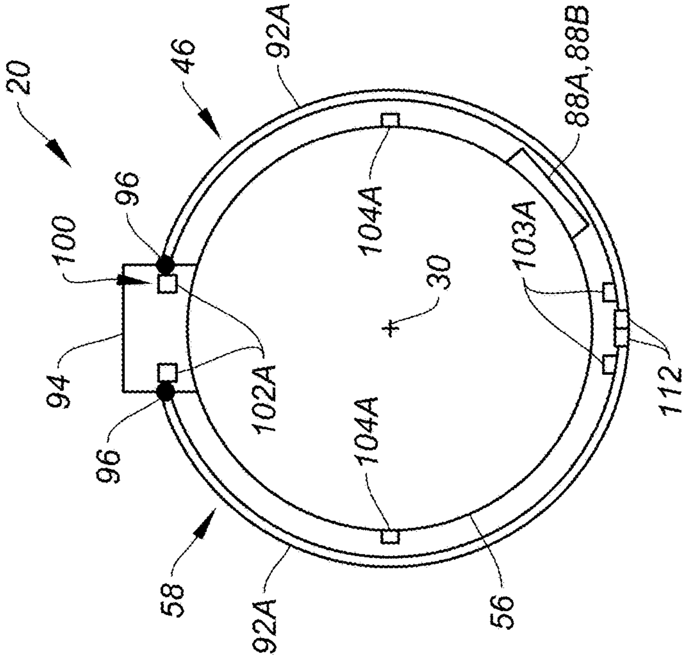
FIG. 3 is an end view schematic illustration of the aircraft propulsion system with its forward housing access structures closed.

Referring to FIGS. 3 and 4, each forward housing access structure 92A may be movably coupled to another stationary structure 94 of the aircraft propulsion system 20; e.g., a mounting beam, a pylon structure, a frame, etc. Each forward housing access structure 92A of FIGS. 3 and 4, for example, is pivotally coupled to the stationary structure 94 by one or more hinges 96. With this arrangement, each forward housing access structure 92A is movable between a closed position (e.g., see FIG. 3) and an open position (e.g., see FIG. 4). In the closed position of FIG. 3, each forward housing access structure 92A closes off access to the outer set of the electric components 88A and 88B. Each forward housing access structure 92A of FIG. 3, for example, axially and circumferentially covers and/or otherwise obstructs access to the outer set of the electric components 88A and 88B from outside of the aircraft propulsion system 20. However, in the open position of FIG. 4, each forward housing access structure 92A opens up access to the outer set of the electric components 88A and 88B. Each forward housing access structure 92A of FIG. 4, for example, uncovers and/or otherwise un-obstructs access to the outer set of the electric components 88A and 88B from outside of the aircraft propulsion system 20.

Figure 6:
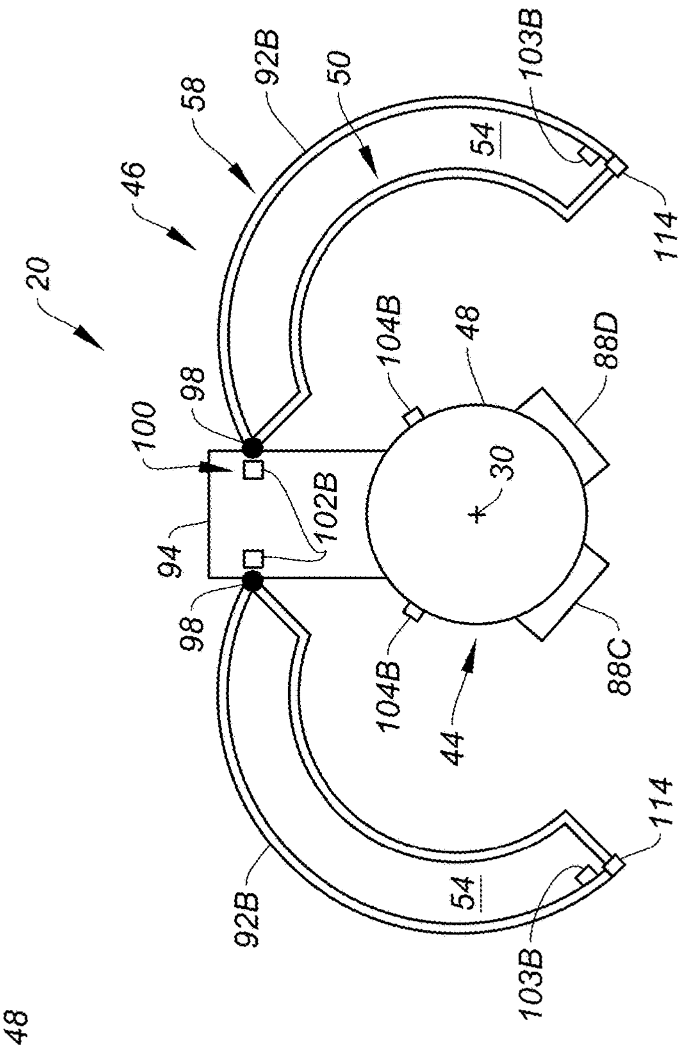
FIG. 6 is an end view schematic illustration of the aircraft propulsion system with its aft housing access structures open.
Figure 5:
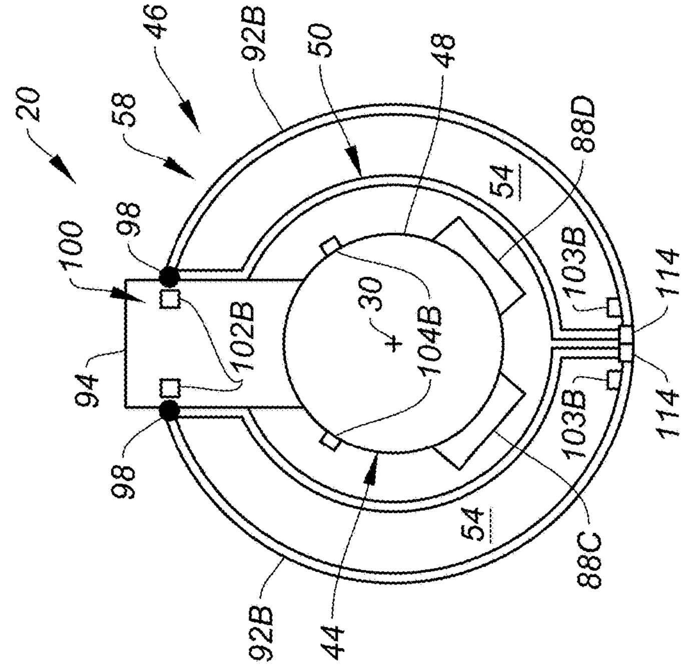
FIG. 5 is an end view schematic illustration of the aircraft propulsion system with its aft housing access structures closed.

Referring to FIGS. 5 and 6, each aft housing access structure 92B may be movably coupled to the stationary structure 94, or still another stationary structure of the aircraft propulsion system 20. Each aft housing access structure 92B of FIGS. 5 and 6, for example, is pivotally coupled to the stationary structure 94 by one or more hinges 98. With this arrangement, each aft housing access structure 92B is movable between a close position (e.g., see FIG. 5) and an open position (e.g., see FIG. 6). In the closed position of FIG. 5, each aft housing access structure 92B closes off access to the inner set of the electric components 88C and 88D. Each aft housing access structure 92B of FIG. 5, for example, axially and circumferentially covers and/or otherwise obstructs access to the inner set of the electric components 88C and 88D from outside of the aircraft propulsion system 20. However, in the open position of FIG. 6, each aft housing access structure 92B opens up access to the inner set of the electric components 88C and 88D. Each aft housing access structure 92B of FIG. 6, for example, uncovers and/or otherwise un-obstructs access to the inner set of the electric components 88C and 88D from outside of the aircraft propulsion system 20.

With one or more of the access structures 92A and/or 92B (generally referred to as "92") in their open positions of FIGS. 4 and 6, (e.g., maintenance and/or inspection) personnel may be capable of purposefully or inadvertently touching one or more of the electric components 88 and/or contacting one or more of the electric components 88 with a tool or the like. Such touching and/or contact may be detrimental to both the personnel and/or the electric components 88 where, for example, the electrical system 86 and one or more of its respective electric components 88 are still powered up and/or have a residual electrical charge. The present disclosure therefore includes an electrical lockout system 100 for the electrical system 86 as shown in FIG. 2. This lockout system 100 of FIG. 2 is configured to (e.g., automatically) trigger an operation to cutoff electrical power transfer between the electrical power source 90 and the electrical system 86. Provision of the lockout system 100 may thereby reduce or prevent potential detrimental effects associated with purposeful and/or inadvertent touching and/or contacting of the electrical system 86 and one or more of its respective electric components 88 when one or more of the access structures 92 are in their open positions of FIGS. 4 and 6 and/or otherwise moved away from their closed positions of FIGS. 3 and 5.

The lockout system 100 of FIG. 2 includes one or more system sensors 102A-104A, 102B-104B, one or more system switches 106A and 106B (generally referred to as "106") (e.g., contactors) and a user interface 108. This lockout system 100 also includes a system controller 110 in signal communication (e.g., hardwired and/or wirelessly coupled to) the system sensors 102A-104A, 102B-104B, the switches 106 and the user interface 108.

Referring to FIGS. 3 and 5, the system sensors 102A-104A, 102B-104B are arranged with and/or proximate the respective access structure 92. Each of these system sensors 102A-104A, 102B-104B is configured to provide information to the system controller 110 indicative of a position and/or status of the respective access structure 92A, 92B. The first system sensor 102A, 102B (generally referred to as "102") of FIG. 3 or 5, for example, is a hinge sensor arranged with the hinge(s) 96, 98 coupling the respective access structure 92A, 92B to the stationary structure 94. This first system sensor 102 is configured to provide a signal (or stop providing a signal) to the system controller 110 when the respective access structure 92A, 92B moves away from and/or is out of its closed position. The second system sensor 103A, 103B (generally referred to as "103") of FIG. 3 or 5 is a latch sensor arranged with a latch 112, 114 for the respective access structure 92A, 92B. This second system sensor 103 is configured to provide a signal (or stop providing a signal) to the system controller 110 when the latch 112, 114 securing the respective access structure 92A, 92B to another structure (e.g., another one of the respective access structures, a stationary structure, etc.) is unlatched. The third system sensor 104A, 104B (generally referred to as "104") of FIG. 3 or 5 is a proximity sensor (or other position sensor) arranged proximate the respective access structure 92A, 92B. The third system sensor 104A of FIG. 3, for example, is mounted to or otherwise with the outer case 56 next to and radially inboard of the forward housing access structure 92A. The third system sensor 104B of FIG. 5, for example, is mounted to or otherwise with the inner case 48 next to and radially inboard of the aft housing access structure 92B. This third system sensor 104 of FIG. 3 or 5 is configured to provide a signal (or stop providing a signal) to the system controller 110 when the respective access structure 92A, 92B moves away from and/or is out of its closed position.

One or more of the switches 106 of FIG. 2 may each be electrically coupled inline between the electrical system 86 and the electrical power source 90. With this arrangement, the switches 106 may be signaled to close to electrically couple the electrical system 86 and the electrical power source 90. By contrast, the switches 106 may be signaled to open to electrically decouple the electrical system 86 from the electrical power source 90. The switches 106 may thereby be operated to electrically cutoff electrical power to the electrical system 86 from the electrical power source 90, or vice versa.

The system controller 110 may be implemented with a combination of hardware and software. The hardware may include memory 116 and at least one processing device 118, which processing device 118 may include one or more single-core and/or multi-core processors. The hardware may also or alternatively include analog and/or digital circuitry other than that described above. The memory 116 is configured to store software (e.g., program instructions) for execution by the processing device 118, which software execution may control and/or facilitate performance of one or more operations such as those described herein. The memory 116 may be a non-transitory computer readable medium. For example, the memory 116 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

During lockout system operation, the system controller 110 receives data (e.g., via the signals) from the system sensor(s) 102-104 indicative of the position and/or the status of the respective access structure 92. When this sensor data is indicative of (1) the respective access structure 92 moving from its closed position (see FIG. 3 or 5) and towards its open position (see FIG. 4 or 6), (2) the respective access structure 92 being out of its closed position (see FIG. 3 or 5), and/or (3) the latch 112, 114 for the respective access structure 92 being unlatched (e.g., disengaged), the system controller 110 may signal one or more of the switches 106 to open such that at least a portion (or an entirety) of the electrical system 86 now accessible via the open (or opening) access structure 92 is de-energized. The system controller 110 may also signal the user interface 108 to display, sound and/or otherwise present a notification to aircraft personnel (e.g., a pilot), maintenance personnel and/or various other personnel that: (a) an electrical system lockout was activated; (b) the respective access structure 92 is open or not closed; and/or (c) the latch 112, 114 is unlatched. In addition or alternatively, the processing device 118 may log an entry in the memory 116 (or another memory) indicative that an electrical system lockout was activated along with a date and time thereof. By contrast, when the sensor data is indicative of (1) the respective access structure 92 being in its closed position (see FIG. 3 or 5) and/or (2) the latch 112, 114 for the respective access structure 92 being latched (e.g., engaged), the switches 106 may remain closed unless commanded to open by another aircraft system and/or controller.

In some embodiments, the system controller 110 may directly command operation of the switches 106 and/or other electrical system shutdown steps. In other embodiments, the system controller 110 may signal another system and/or component for the aircraft propulsion system 20 to initiate the cutoff of the electrical power to the electrical system 86 from the electrical power source 90. For example, when the sensor data is indicative of (1) the respective access structure 92 moving from its closed position (see FIG. 3 or 5) and towards its open position (see FIG. 4 or 6), (2) the respective access structure 92 being out of its closed position (see FIG. 3 or 5), and/or (3) the latch for the respective access structure 92 being unlatched (e.g., disengaged), the system controller 110 may notify the onboard controller. The onboard controller may subsequently facilitate cutting off the electrical power to the electrical system 86 from the electrical power source 90.

In some embodiments, there may be a need to energize an accessible portion of the electrical system 86 (e.g., for maintenance activity, testing, etc.) even when the respective access structure(s) 92 is/are open. In such circumstances, it is contemplated the user interface 108 and/or another switch or device may be used to manually override the lockout system 100. In some examples, the user interface 108 may be associated with a separate computing device (e.g., a maintenance computing device) that is coupled to the system controller 110 via a wired and/or wireless connection.

Figure 7:
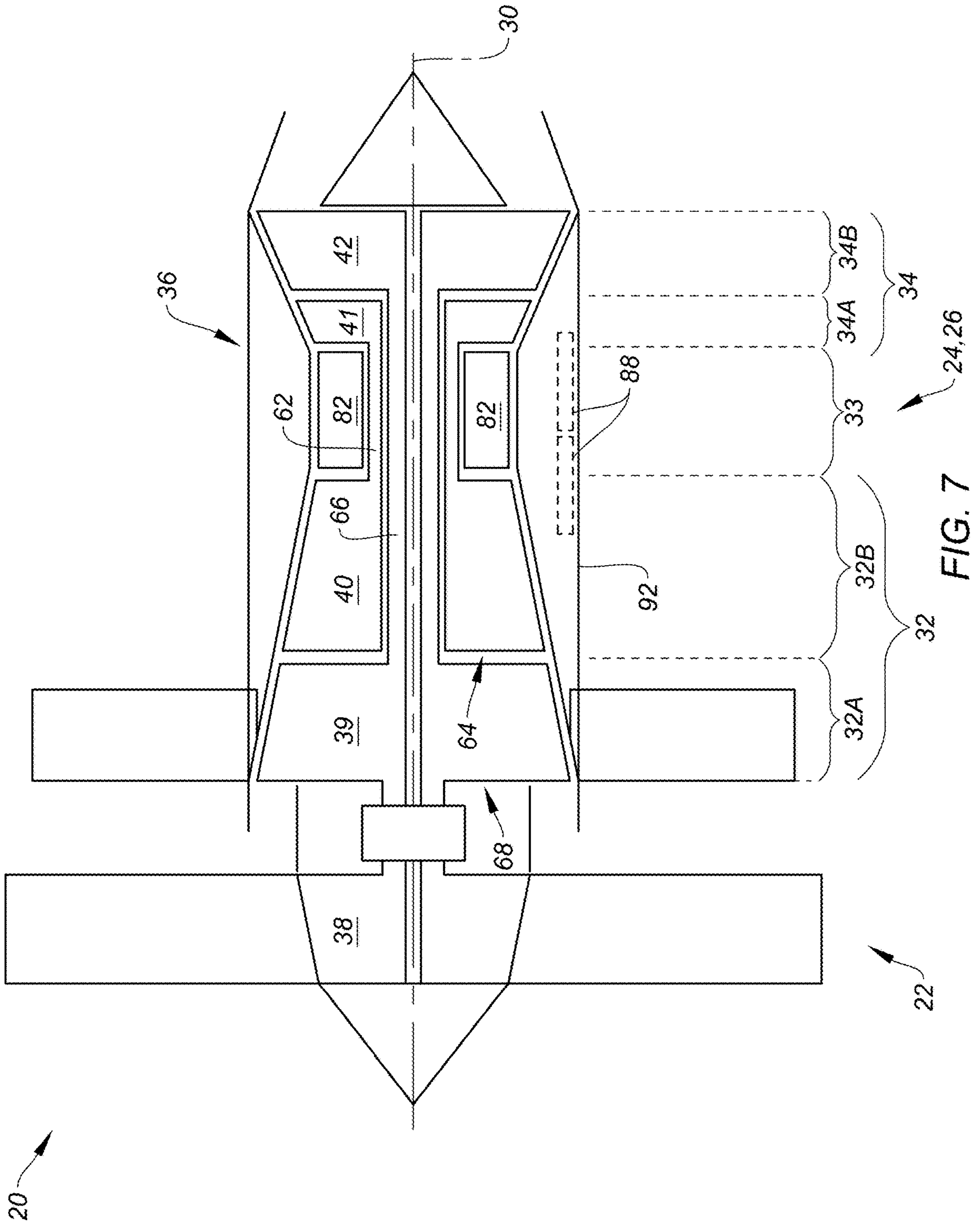
FIG. 7 is a partial schematic sectional illustration of the aircraft propulsion system with an open rotor propulsor section.

The lockout system 100 is described above with reference to the aircraft propulsion system 20 of FIG. 1 with its ducted propulsor rotor 38 for ease of description. However, it is contemplated the lockout system 100 may alternatively be provided for various other aircraft propulsion systems. The lockout system 100, for example, may be configured to operate based on a position and/or a status of one or more nacelle cowl doors (or other access structures) for an open rotor propulsion system of FIG. 7. For example, the systems and functionalities described above may be applied to doors or sections of a nacelle 36, a nose cone, a stator vane carrier (e.g., a carrier or a mounting device to which one or more stator vanes may be coupled), and/or the like.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A propulsion system for an aircraft, comprising:

a propulsor rotor;

a powerplant coupled to and configured to drive rotation of the propulsor rotor, an electrical system for the powerplant configured to receive electrical power from an electrical power source, the electrical system comprising a plurality of electrical components mounted to or integrated with the propulsion system;;

a nacelle comprising an access structure configured to move between a first position and a second position, the access structure obstructs access to the plurality of electrical components when in the first position, and un-obstructs access to the plurality of electrical components when in the second position;

one or more switches electrically coupled between the electrical power source and the electrical system and configured to electrically couple the electrical power source to the electrical system during propulsion system operation; and a lockout system configured to automatically trigger opening of the one or more switches to electrically decouple the electrical power source from the electrical system in response to movement of the access structure away from the first position, wherein the opening of the one or more switches de-energizes the plurality of electrical components.

2. The propulsion system of claim 1, wherein the lockout system is configured to automatically trigger the operation to cut off the electrical power to the electrical system from the electrical power source when the access structure is out of the first position.

3. The propulsion system of claim 1, further comprising:

a controller, the lockout system configured to provide a lockout signal to the controller when the access structure moves away from the first position, and the controller configured to control operation of the one or more switches such that the one or more switches open in response to the controller receiving the lockout signal.

4. The propulsion system of claim 1, further comprising a user interface configured to provide a notification in response to the lockout system cutting off the electrical power to the electrical system from the electrical power source.

5. The propulsion system of claim 1, further comprising:

a memory; and a processing device configured to log an entry in the memory in response to the lockout system cutting off the electrical power to the electrical system from the electrical power source.

6. The propulsion system of claim 1, wherein the electrical system comprises an electric machine.

7. The propulsion system of claim 1, wherein the electrical system comprises a controller.

8. The propulsion system of claim 1, wherein the electrical power source comprises a battery system onboard the aircraft.

9. The propulsion system of claim 1, wherein the electrical power source comprises an electrical power bus onboard the aircraft.

10. The propulsion system of claim 1, wherein the powerplant comprises a thermal engine.

11. The propulsion system of claim 1, wherein the access structure comprises a cowl door.

12. The propulsion system of claim 1, wherein the access structure comprises a thrust reverser half.

13. The propulsion system of claim 1, wherein the access structure comprises an access panel.

14. The propulsion system of claim 1, wherein the lockout system comprises a latch sensor configured to sense when a latch for the access structure is unlatched; and the lockout system is configured to automatically trigger the operation to cut off the electrical power to the electrical system from the electrical power source when the latch sensor senses the latch is unlatched.

15. The propulsion system of claim 1, wherein the lockout system comprises a proximity sensor configured to sense when the access structure moves from the first position; and the lockout system is configured to automatically trigger the operation to cut off the electrical power to the electrical system from the electrical power source when the proximity sensor senses the access structure moving from the first position.

16. The propulsion system of claim 1, wherein the lockout system comprises a hinge sensor disposed at a hinge connecting the access structure to another structure of the propulsion system; and the lockout system is configured to automatically trigger the operation to cut off the electrical power to the electrical system from the electrical power source when the hinge sensor senses movement in the hinge.

17. The propulsion system of claim 1, further comprising an override configured to override the lockout system and electrically couple the electrical power source to the electrical system.

18. A propulsion system for an aircraft, comprising:

a turbine engine including a compressor section, a combustor section and a turbine section;

an electrical system comprising a plurality of electrical components arranged with the turbine engine, the electrical system configured to receive electrical power from an electrical power source onboard the aircraft;

a housing structure at least partially surrounding the turbine engine, the housing structure comprising an access structure covering a portion of the turbine engine with access to the electrical system, and the access structure configured in a first position for propulsion system operation, wherein the access structure is configured to be moved from the first position for propulsion system maintenance and/or propulsion system inspection; and a lockout system configured to trigger electric decoupling of the electrical power source from the electrical system when the access structure moves away from the first position to uncover th portion of the turbine engine with access to the electrical system.

19. An open rotor propulsion system for an aircraft, comprising:

a turbine engine including a compressor section, a combustor section and a turbine section;

an electrical system comprising an electrical component arranged with the turbine engine, the electrical system configured to direct electrical power from an electrical power source onboard the aircraft to the electrical component at least during propulsion system operation;

a housing structure at least partially housing the turbine engine, the housing structure comprising an access structure covering a portion of the turbine engine with access to the electrical system, and the access structure configured in a first position for the propulsion system operation, wherein the access structure is configured to be moved from the first position for propulsion system maintenance and/or propulsion system inspection;

one or more switches electrically coupled between the electrical power source and the electrical system and configured to electrically couple the electrical power source to the electrical system during operation of the open rotor propulsion system; and a lockout system configured to open the one or more switches to electrically decouple the electrical power source from the electrical system when the access structure is disposed out of the first position to uncover the portion of the turbine engine with access to the electrical system.

* * * * *